Patented Jan. 6, 1942

2,269,399

UNITED STATES PATENT OFFICE 2,269,399

DISUBSTITUTED CYANAMIDES

Richard O. Roblin, Jr., Stamford, Conn., assignor to American Cyanamid Company, New York, N. Y., a corporation of Maine No Drawing. Application May 23, 1939, Serial No. 275,220

4 Claims. (Cl. 260—551)

This invention relates to new disubstituted cyanamide compounds of the formula—

where R represents a substituted aryl radical and R' represents an aralkyl radical.

These compounds may be generally prepared in an inert solvent such as benzene or petroleum ether fractions by the reaction between the corresponding secondary amine, cyanogen chloride and caustic soda. A preferred equation for this reaction is as follows:

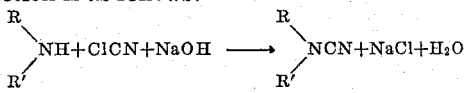

Example I 6.1 grams of cyanogen chloride are dissolved in 100 cc. of benzene. After cooling the solution to 0°–5° C., 19.7 grams of o-tolyl benzyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as o-tolyl benzyl cyanamide.

Example II 6.1 grams of cyanogen chloride are dissolved in 100 cc. of heptane. After cooling the solution to 0°–5° C., 19.7 grams of p-tolyl benzyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as p-tolyl benzyl cyanamide.

Example III 6.1 grams of cyanogen chloride are dissolved in 100 cc. of benzene. After cooling the solution to 0°–5° C., 22.8 grams of m-nitrophenyl benzyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as m-nitro-phenyl benzyl cyanamide.

Example IV 6.1 grams of cyanogen chloride are dissolved in 100 cc. of benzene. After cooling the solution to 0°–5° C., 22.8 grams of p-nitro-phenyl benzyl amine are gradually added with stirring. When this addition is completed the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as p-nitro-phenyl benzyl cyanamide.

Example V 6.1 grams of cyanogen chloride are dissolved in 100 cc. of heptane. After cooling the solution to 0°–5° C., 21.7 grams of o-chlorophenyl benzyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as o-chlorophenyl benzyl cyanamide.

Example VI 6.1 grams of cyanogen chloride are dissolved in 100 cc. of heptane. After cooling the solution to 0°–5° C., 24.7 grams of o-tolyl-1-naphthylmethyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as o-tolyl-1-naphthyl-methyl cyanamide.

Similarly other disubstituted cyanamides of the above class may be prepared utilizing the corresponding secondary amine.

It is to be understood that the above examples are illustrative only.

These new compounds are adapted for various uses, more particularly as intermediates, insecticides and plasticizers for natural and synthetic resins.

While the invention has been described with particular reference to specific embodiments, it is to be understood that it is not to be limited thereto but is to be construed broadly and restricted solely by the scope of the appended claims.

I claim:

1. As a new compound, a disubstituted cyanamide of the formula—

where R represents a substituted aryl radical and R' represents an aralkyl radical.

2. As a new compound, p-nitro-phenyl benzyl cyanamide.

3. As a new compound, o-chlorophenyl benzyl cyanamide.

4. As a new compound, o-tolyl-1-naphthyl-methyl cyanamide.

RICHARD O. ROBLIN, JR.